United States Patent
Moir et al.

(10) Patent No.: US 8,560,816 B2
(45) Date of Patent: Oct. 15, 2013

(54) SYSTEM AND METHOD FOR PERFORMING INCREMENTAL REGISTER CHECKPOINTING IN TRANSACTIONAL MEMORY

(75) Inventors: Mark S. Moir, Windham, NH (US); David Dice, Foxboro, MA (US); Daniel S. Nussbaum, Cambridge, MA (US); James R. Goodman, Auckland (NZ)

(73) Assignee: Oracle International Corporation, Redwood City, CA (US)

( * ) Notice: Subject to any disclaimer, the term of this patent is extended or adjusted under 35 U.S.C. 154(b) by 546 days.

(21) Appl. No.: 12/827,842

(22) Filed: Jun. 30, 2010

(65) Prior Publication Data

US 2012/0005461 A1    Jan. 5, 2012

(51) Int. Cl.
*G06F 9/00* (2006.01)
(52) U.S. Cl.
USPC ......................................................... 712/228
(58) Field of Classification Search
USPC ......................................................... 712/228
See application file for complete search history.

(56) References Cited

U.S. PATENT DOCUMENTS

| | | | |
|---|---|---|---|
| 6,470,445 B1 * | 10/2002 | Arnold et al. | 712/218 |
| 2004/0230778 A1 | 11/2004 | Chou et al. | |
| 2005/0050304 A1 * | 3/2005 | Mukherjee et al. | 712/218 |
| 2005/0050386 A1 | 3/2005 | Reinhardt et al. | |
| 2005/0251664 A1 | 11/2005 | Caprioli et al. | |
| 2005/0251666 A1 | 11/2005 | Chaudhry et al. | |
| 2005/0273580 A1 | 12/2005 | Chaudhry et al. | |
| 2008/0162990 A1 | 7/2008 | Wang et al. | |
| 2008/0244544 A1 | 10/2008 | Neelakantam et al. | |
| 2008/0288558 A1 * | 11/2008 | De Pauw et al. | 707/202 |

OTHER PUBLICATIONS

Martin et al. (Exploiting dead value information); MICRO 30 Proceedings of the 30th annual ACM/IEEE international symposium on Microarchitecture, 1997; pp. 125-135.*
U.S. Appl. No. 12/250,409, filed on Oct. 13, 2008.

* cited by examiner

*Primary Examiner* — Keith Vicary
(74) *Attorney, Agent, or Firm* — Robert C. Kowert; Meyertons, Hood, Kivlin, Kowert & Goetzel, P.C.

(57) ABSTRACT

Systems and methods described herein for performing incremental register checkpointing may employ a special register to indicate which registers have already been checkpointed. This register may include one bit per register. These systems may also include a special pointer register whose value identifies a location in user memory or in dedicated on-chip storage at which a copy of a register's value should be saved by a checkpointing operation. Only registers modified during speculative execution or execution of a transaction may be checkpointed (e.g., when register modifying instructions are encountered) and subsequently restored (e.g., due to misspeculation or transaction abort), rather than all of the registers of the processor. Each register may be checkpointed at most once for a given speculative episode or atomic transaction. Setting a bit in the special register may prevent checkpointing of the corresponding register. Setting all of the bits in the special register may disable checkpointing.

16 Claims, 7 Drawing Sheets

SYSTEM AND METHOD FOR PERFORMING INCREMENTAL REGISTER CHECKPOINTING IN TRANSACTIONAL MEMORY

BACKGROUND OF THE INVENTION

1. Field of the Invention

This invention relates generally to checkpointing and restoring processor registers in systems that support speculative mechanisms, and more particularly to a system and method for implementing incremental register checkpointing for transactions and in other speculation contexts.

2. Description of the Related Art

Speculative mechanisms often require the values of a processor's registers (i.e. the processor's register file) to be saved (or "checkpointed") so that they may subsequently be restored in the case of misspeculation. Examples of speculative mechanisms include transactional memory (TM) and thread-level speculation (TLS), as well as software-transparent speculative mechanisms. In some existing processors, such checkpointing of the register file is implemented in hardware each time a transaction or other speculative mechanism is invoked. Checkpointing registers and restoring registers when a transaction or speculative episode is aborted can be very fast (e.g., single cycle) operations, in some systems. However, existing hardware approaches to register checkpointing have a number of shortcomings that limit their utility and effectiveness in many contexts. Alternatively, the register file can be saved in memory by software and subsequently restored when necessary. This approach requires no special hardware support, but it is too slow to be suitable for general use. For example, it may be prohibitively slow for use with small transactions, for which it is critical to keep latency low.

SUMMARY

Speculative mechanisms, including transactional memory implementations, often require the values of a processor's registers to be checkpointed so that they may subsequently be restored in the case of misspeculation (or transaction failure). The systems described herein may in various embodiments include mechanisms for incrementally checkpointing only those registers that are overwritten during a speculative episode or transaction. This may allow for very low overhead for short speculative code paths (e.g., short transactions) that modify few registers, especially if the speculations (or transactions) are successful (which may be the more common case). In some embodiments, the system may checkpoint a register only when it is about to be modified and only if it has not been checkpointed previously, rather than conservatively checkpointing all of the processor's registers at the beginning of every transaction or speculation episode.

As described herein, an incremental approach to register checkpointing may allow a much wider range of implementation options for checkpoint and/or restore operations, including hardware implementations that are simpler and more flexible than those of previous systems, or implementations that employ software for at least part of the restore and/or checkpoint functionality. As previously noted, the systems and methods described herein for incremental register checkpointing may be applied in the context of transactional memory implementations and in the context of speculation mechanisms other than transactional speculation, in various embodiments.

In some embodiments, a processor may be configured to initiate execution of a sequence of instructions comprising an atomic transaction. As described herein, the processor may be configured to checkpoint only the register or registers that are to be modified by instructions within the atomic transaction, and to checkpoint them as instructions that modify them are encountered, rather than conservatively checkpointing all of the registers in the processor's register file prior to, or at the beginning of, an atomic transaction. For example, an instruction within the atomic transaction that modifies a value of a processor register may be encountered during execution of the atomic transaction. In response to encountering this instruction, the processor may be configured to determine whether the processor register should be checkpointed before its value is modified by the instruction. If it is determined that the processor register should be checkpointed, the processor may be configured to copy the value of the processor register to another memory location, and to set the value of an indicator associated with the processor register to a value that indicates that the processor register has been checkpointed. As described herein, no other processor registers are checkpointed in response to encountering the instruction, unless they are also modified by the instruction. In some embodiments, at least some of determining whether the processor register should be checkpointed, copying the value of the processor register to another memory location, and/or setting the value of an indicator associated with the processor register may be performed by hardware mechanisms within the processor.

In some embodiments, determining whether the processor register should be checkpointed may include checking the value of the indicator associated with the processor register to see if the value of the indicator indicates that the processor register has already been checkpointed, or if the value of the indicator otherwise indicates that the processor register should not be checkpointed. For example, in some embodiments, prior to executing the instructions within the atomic transaction, the processor may be configured to set the value of the indicator associated with the processor register to a value that indicates that the processor register should not be checkpointed, regardless of whether or not its value is modified by any of the instructions within the atomic transaction. In response to determining that the processor register should not be checkpointed, the processor may execute the instruction that modifies the value of the processor register without checkpointing the processor register.

In some embodiments, the processor may be configured to set the value of a pointer to a value identifying the memory location at which the value of the processor register is to be copied at some point prior to the processor register being checkpointed. For example, the pointer value may be set to a value that identifies a location in user memory or in on-chip storage, such as the base of an array or another location in an array or scratch memory area in which checkpointed register values are to be stored. In some embodiments, the pointer value may be set prior to initiating execution of the atomic transaction or at the beginning of the atomic transaction to identify the first location in which a register value is to be stored by a checkpointing operation, and the pointer value may be incremented each time a register is checkpointed so that it points to the next location in which a register value is to be stored, e.g., by a subsequent checkpointing operation.

In some embodiments, in response to the atomic transaction failing (e.g., if the transaction aborts or otherwise fails to commit its results), the processor may be configured to restore the copied value of the processor register to the processor register. In some embodiments, the checkpointed register value may be restored only if it is determined that the processor register is or will be read prior to being modified by another instruction. In some embodiments, in response to completion of the atomic transaction (whether successful or unsuccessful), the processor may set the value of the indicator associated with the processor register to a value that indicates that the processor register has not been checkpointed (i.e. the processor may reset the indicator).

While many of the examples described herein are directed to embodiments in which incremental register checkpointing is employed in conjunction with transactional memory implementations, the systems and methods described herein may in some embodiments be employed in other speculation contexts, e.g., in conjunction with thread-level speculation or software-transparent speculative mechanisms.

Figure 1:
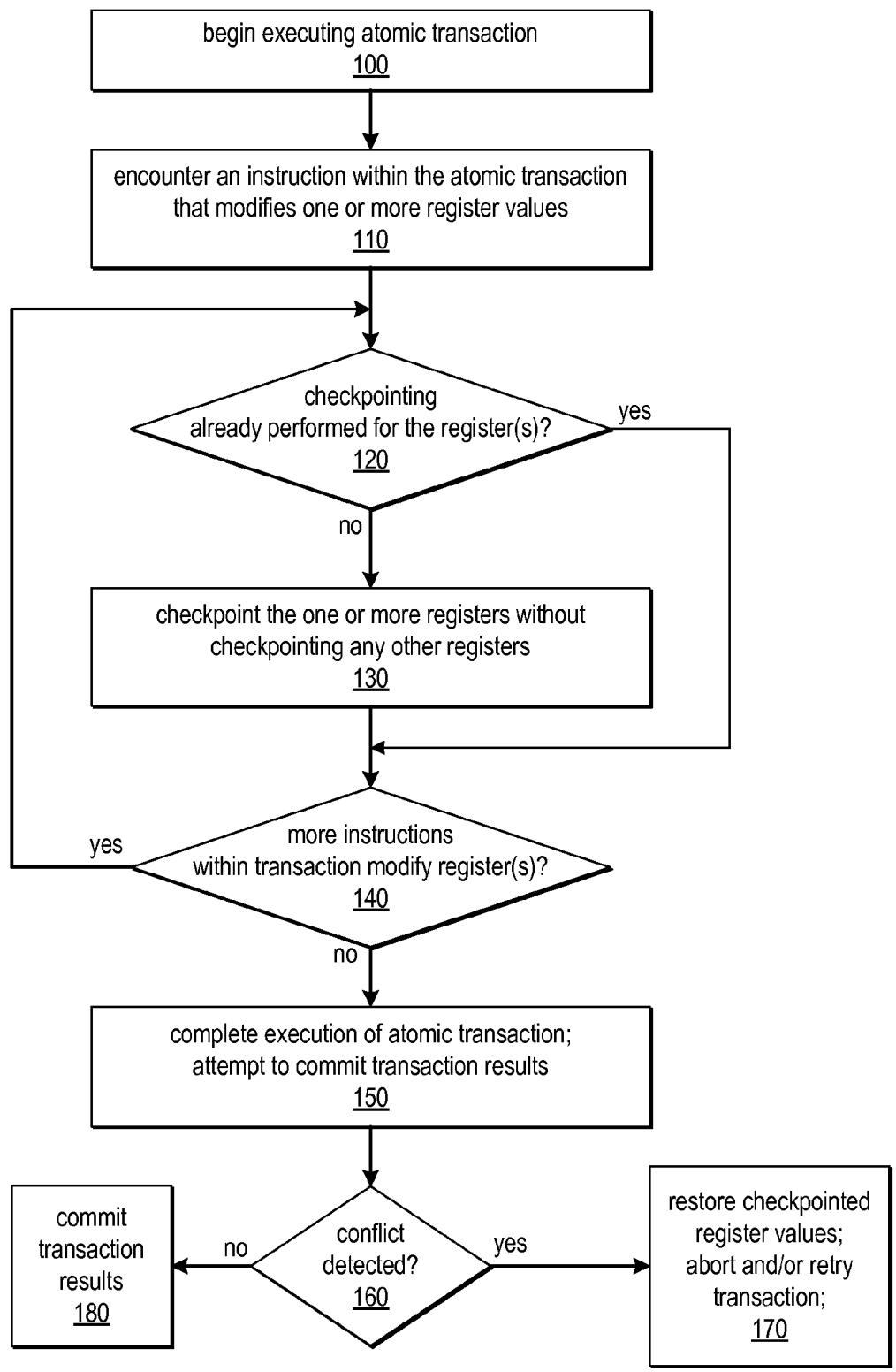
FIG. 1 is a flow diagram illustrating one embodiment of a method for performing incremental register checkpointing in a system that includes transactional memory, as described herein.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Speculative mechanisms often require the values from a set of registers to be saved so that they may subsequently be restored in the case of misspeculation. Examples include transactional memory and thread-level speculation, as well as software-transparent speculative mechanisms. Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. Transactional memory may be implemented in hardware, in software, or in a combination of the two, in various embodiments.

Transactional memory (TM) implementations may provide programmers with the ability to specify a region of code as "atomic". When a region of code is so designated, it should appear as if the section is executed in its entirety or not at all, and it should appear as if the executions of concurrently executing atomic blocks are not interleaved with each other. This capability may dramatically simplify the construction of concurrent programs that are correct, efficient, and scalable, because it relieves programmers of the need to explicitly embed synchronization mechanisms into their application code (for example using mutual exclusion locks to explicitly prevent the concurrent execution of different "critical sections" of code). Typical TM implementations execute atomic blocks of code as "optimistic" transactions, meaning that, rather than preventing concurrent execution, they proceed with the hope that no interference occurs, and have the capability to confirm that this is the case, rolling back the transaction and retrying it in the case that there is interference. While many of the examples described herein are directed to the use of incremental register checkpointing in transactional memory, the systems and methods described herein may in some embodiments be employed in other speculation contexts, e.g., with thread-level speculation or software-transparent speculative mechanisms.

As previously noted, checkpointing of a processor's register file can be implemented in hardware or in software, in different systems. For example, some existing processors perform hardware checkpointing of all of the registers of the processor's register set at the beginning of each transaction or transactional speculation. In such systems, hardware-implemented checkpointing of a register file and hardware-implemented restoring of the register file when a transaction or speculative episode is aborted can be very fast (e.g., single cycle) operations. However, there are a number of shortcomings with current hardware-implemented approaches, which limit their utility and effectiveness in many contexts. For example, such hardware mechanisms typically require a large amount of on-chip real estate to be dedicated to storing checkpoints (i.e. saved values) for all of the processor's registers. In addition, these mechanisms typically introduce significant complexity, which may be reasonable in some contexts but not in others. For example, a successful transaction may not be able to call a non-leaf procedure.

Alternatively, a register file can be saved in memory by software and subsequently restored when necessary, e.g., by writing code to save the contents of all registers in memory before beginning a transaction, and to restore the values from memory in case the transaction aborts. Such software mechanisms conservatively save the contents of all of the processor's registers, even though the transaction may modify only a small number of them. In systems that implement such an approach, this high cost is paid by all transactions once to save register state, and a similar cost is paid a second time by transactions that abort, because they must restore the saved values. This approach can be attractive because it requires no special hardware support. However, it can be too slow to be generally applicable. For example, it may be unacceptable for use with small transactions, for which it may be critical to keep latency low.

In some systems that perform software-only checkpointing, compiler analysis may be used to avoid saving registers that do not need to be restored upon abort. For example, the compiler may determine which registers may be overwritten by the transaction, and may allow the software to save only those registers. However, if a transaction calls a procedure in another compilation unit, or in a library, then this analysis and resulting optimization may not be possible. Even when all of a transaction's code can be analyzed statically, it is possible that a transaction contains a common fast path that modifies few registers and a less common path (e.g., an error handling path) that modifies more registers. In this case, a software-only checkpointing mechanism would need to save the contents of all of the registers used by both paths, even though saving the registers used by the less common path may almost always be unnecessary.

In addition, depending on calling conventions, either the caller or the callee is responsible for preserving the contents of a given register across a procedure call. In the case that a transaction calls a first procedure which in turn calls a second procedure, and the transaction aborts during the execution of the second procedure, the first procedure does not complete execution and thus does not restore the caller-saved registers (i.e. the registers it saved before calling the second procedure). Similarly, the second procedure does not restore the values of the callee-saved registers (i.e. the registers it was responsible for saving). Thus, in general, a transaction that calls a procedure may need to save the contents of any register that may be either a caller-saved or a callee-saved register of any procedure that it directly or indirectly calls. This adds a substantial overhead to the cost of executing a transaction, especially a short one, for which latency is critical.

The systems described herein may in various embodiments include mechanisms for incrementally checkpointing only those registers that are overwritten, thus allowing for very low overhead for short transactions that modify few registers, especially if they commit (which is hopefully the common case). In some embodiments, the system may checkpoint a register only when it is about to be modified and only if it has not been checkpointed previously, rather than conservatively checkpointing all of the processor's registers at the beginning of every transaction. As described herein, this approach may allow a much wider range of implementation options for checkpoint and/or restore operations, including hardware implementations that are simpler and more flexible than those of previous systems, or implementations that employ software for at least part of the checkpoint and/or restore functionality. As previously noted, the systems and methods described herein for incremental register checkpointing may also be applied in the context of speculation mechanisms other than transactional speculation, in some embodiments.

The systems and methods described herein for incremental register checkpointing may in some embodiments be employed in systems that provide an interface for using hardware transactions, thus allowing details of the underlying implementation to be abstracted from user software. Such an interface may allow software that includes transactions to be executed in systems that implement transactional memory in different ways, and using different mechanisms. In particular, such an approach may allow user code or application software to be employed with transactional memory implementations that handle register checkpointing in hardware, or that use a software-only approach that does not require hardware support for checkpointing, or that use a hardware-facilitated incremental checkpointing approach, such as that described herein. Defining such an interface and encouraging software to use it may allow designers of such features maximal flexibility in checkpointing and/or restoring the registers of processor without constraining which software can use any particular feature or approach.

An interface similar to that illustrated by the following example code may in some embodiments be used to invoke a hardware transactional memory feature. In this example code, PTI stands for Portable Transaction Interface.

```
int PTI_beginTransaction( )      // returns 0 for starting a transaction
                                 // a non-zero value encodes feedback about a failure on abort
void PTI_commitTransaction( )    // returns true upon a successful commit
```

In this example, the following code may be used to execute <stmts> in a hardware transaction:

```
int rv = PTI_beginTransaction( );
   if (rv == 0) {
      <stmts>
      PTI_commitTransaction( );
   } else {
      // decide based on rv whether/when to retry, branch to appropriate code
   }
```

Note that while the techniques described herein are applicable to transactional memory features that require the code in <stmts> above to be specially compiled (for example to instrument memory operations with special barriers, or to use special transactional instructions), they may also be applicable in systems in which this is not a requirement.

To implement an interface for using hardware transactions in a system that automatically handles register checkpointing in hardware, the following example code may suffice:

```
    .inline PTI_beginTransaction, 0
    .volatile
    chkpt  1f            // start transaction, branch to 1: on abort
    ba     2f            // continue with transaction code
    mov    0, %o0        // delay slot: return 0 to transaction code
1:  rd     %cps, %o0     // return (non-zero) value of status register (CPS)
2:  .nonvolatile
    .end
    .inline PTI_commitTransaction, 0
    .volatile
    commit
    .nonvolatile
    .end
```

In this example, the code above may depend on the fact that the processor automatically restores checkpointed registers when a transaction aborts. Thus, the code at label 1 may simply read a value from a status register (i.e. the CPS register, in this example) that indicates the reason the transaction failed, and then return to the user code that called PTI_beginTransaction.

To implement a similar interface using a transactional memory feature that does not automatically checkpoint registers when a transaction begins and restore them when a transaction aborts, additional code may be needed to save register state to memory before executing the chkpt instruction, and additional code may be needed to restore these registers at label 1, i.e. after the transaction aborts (not shown above). An implementation that employs the techniques described herein for incrementally saving and restoring register values may in some embodiments also include additional code at these same points. However, rather than simply saving the values of all of the processor's registers before beginning the transaction, and restoring them all after a transaction aborts, this additional code may make use of new hardware features described herein to perform incremental register checkpointing.

One method for performing incremental register checkpointing in a system that includes transactional memory is illustrated in FIG. 1. As shown at 100, the method may include beginning execution of the atomic transaction. In contrast to some existing systems, the system described herein may not checkpoint the entire register set when beginning execution of a transaction (or prior to execution of a transaction). Instead, only those registers that are to be modified by the instructions within the transaction may be checkpointed. In such embodiments, during execution of the transaction, an instruction that modifies one or more registers may be encountered, as in 110. In response to encountering this instruction, the system may be configured to determine whether the register or registers that would be modified by the instruction have already been checkpointed, as shown at 120. For example, in some embodiments, the method may include examining the value of an indicator associated with the register or registers that indicates whether or they have already been (or otherwise should not be) checkpointed.

If any of the register(s) to be modified by this instruction have not already been checkpointed, shown as the negative exit from 120, the method may include checkpointing only the register(s) to be modified by this instruction that have not already been checkpointed, without checkpointing any other registers, as in 130. If all of the register(s) to be modified by this instruction have already been checkpointed, shown as the positive exit from 120, or once any of the registers to be modified by this instruction that had not already been checkpointed have been checkpointed, shown as the exit from 130, the method may include continuing execution. If there are more instructions within the transaction that modify one or more registers, shown as the positive exit from 140, the method may include repeating the operations illustrated in FIG. 1 as 120-130 for these additional instructions.

Once there are no more instructions within the transaction that modify any registers, shown as the negative exit from 140, the method may include completing execution of the atomic transaction, as in 150. For example, the method may include executing any remaining instructions that are within the scope of the atomic transaction. As illustrated at 150 in FIG. 1, the method may also include attempting to commit the transaction results. If a conflict is detected during the attempt to commit the transaction results, shown as the positive exit from 160, the method may include restoring the checkpointed register values, as in 170. In other words, the method may include copying the values saved by the checkpointing mechanism back to the registers that were modified by the instructions of the transaction to restore the contents of the registers to their pre-transaction values. As illustrated in FIG. 1, the method may also include aborting the transaction and/or retrying the transaction in response to detecting a conflict during the attempt to commit the results of the transaction. If no conflicts are detected during the attempt to commit the transaction, shown as the negative exit from 170, the method may include committing the transaction results, as in 180.

Again note that in various embodiments, some of which are described herein, all or part of the checkpointing operation may be done in hardware, and all or part of the restoring operation may be done in software, with or without hardware assistance.

In some embodiments, the system described herein may use hardware to incrementally checkpoint registers whose values are modified by a transaction. In such embodiments, the name of each checkpointed register and its "old" contents may be stored in memory (e.g., user memory or special on-chip storage dedicated for this purpose) as part of the checkpointing operation prior to modifying the value of the register. In some embodiments, if the transaction aborts, the saved register values may be restored by software (i.e. the stored values may be written back to the registers from which they were copied). In some embodiments, each register may need to be checkpointed at most once per transaction, e.g., the first time it is to be modified.

To track which registers have been checkpointed so far, the system may include a special system register called "SavedRegs", which contains one bit for each processor register that may at some point need to be checkpointed (e.g., each register that may ever need to be checkpointed in response to execution of this or any other speculative mechanism). In this example, SavedRegs may be set to a new value by a new processor instruction "SetSavedRegs" and may be read by another new processor instruction "ReadSavedRegs". In some embodiments, to begin a checkpointing operation, SavedRegs may be set to all zeros, as described below. Conversely, setting this register to all ones may disable checkpointing, in some embodiments.

In some embodiments, the system may include another special register called "OldRegisterValues", which may store a pointer value that points to a location in user memory at which the name and contents of a register may be saved by a checkpointing operation before the register is modified. In some embodiments, before starting a transaction, the code beginning a transaction (e.g., PTI_beginTransaction) may set the value of OldRegisterValues to point to an area of memory large enough to store the names and contents of all of the processor's registers, and then may set SavedRegs to all zeros, thereby initiating checkpointing for the transaction. In such embodiments, when checkpointing is operating (e.g., in response to the SavedRegs register having been set to all zeros), the processor may behave normally except that, before executing any instruction that modifies a register, if the bit corresponding to that register in the SavedRegs register is zero, the register may be checkpointed. More specifically, when checkpointing is operating, and an instruction is decoded that writes to a register whose corresponding bit in SavedRegs is zero, before putting this instruction into the pipeline, additional instructions to store the name of the register and its current value at the above-mentioned location may be inserted into the pipeline before this instruction, and the corresponding bit in SavedRegs may be set to 1.

In some embodiments, the name of the register and its current contents may be written to the "next" location in an array in user memory beginning at the address stored in the OldRegisterValues register. Note that these values may be written to user memory using non-transactional store operations. Therefore, these stores may not be rolled back (i.e. undone) if the transaction aborts, which may be a necessary condition to allow the checkpointed registers to be restored. In some embodiments, the address of the next location in which to store a checkpointed register name and corresponding value may be determined by using OldRegisterValues as the base of the array, and calculating the offset using the number of bits that are set in SavedRegs (since this number may reflect the number of registers that have been checkpointed previously). In some embodiments, calculation of this address may be optimized by incrementing the OldRegisterValues register by an appropriate amount each time a register is checkpointed, so that the location to use for the next checkpointed register is always available.

Note that not all embodiments may include an OldRegisterValues pointer register (or a similar register) to identify locations at which register values (and corresponding register names) may be stored by a checkpointing operation. For example, in some embodiments, each register value that is checkpointed may be written to a corresponding register of a backup register file (e.g., one dedicated to checkpoint and restore operations). In such embodiments, there may be no need to identify the location at which each register value is stored by a checkpointing operation. In another example, a scratch array at a fixed (known) location in memory may be dedicated to checkpoint and restore operations. In such embodiments, rather than maintaining a pointer to the array, the system may only need to maintain a counter that is incremented each time a register is checkpointed, and the value of the counter may be used as an index into the array to identify the particular array entry at which each register value (and corresponding register name) is stored by a series of checkpointing operations. In such embodiments, the counter may be decremented during a restore operation, as each entry is accessed and the value stored in that entry is written back to the register identified in the entry.

Figure 2:
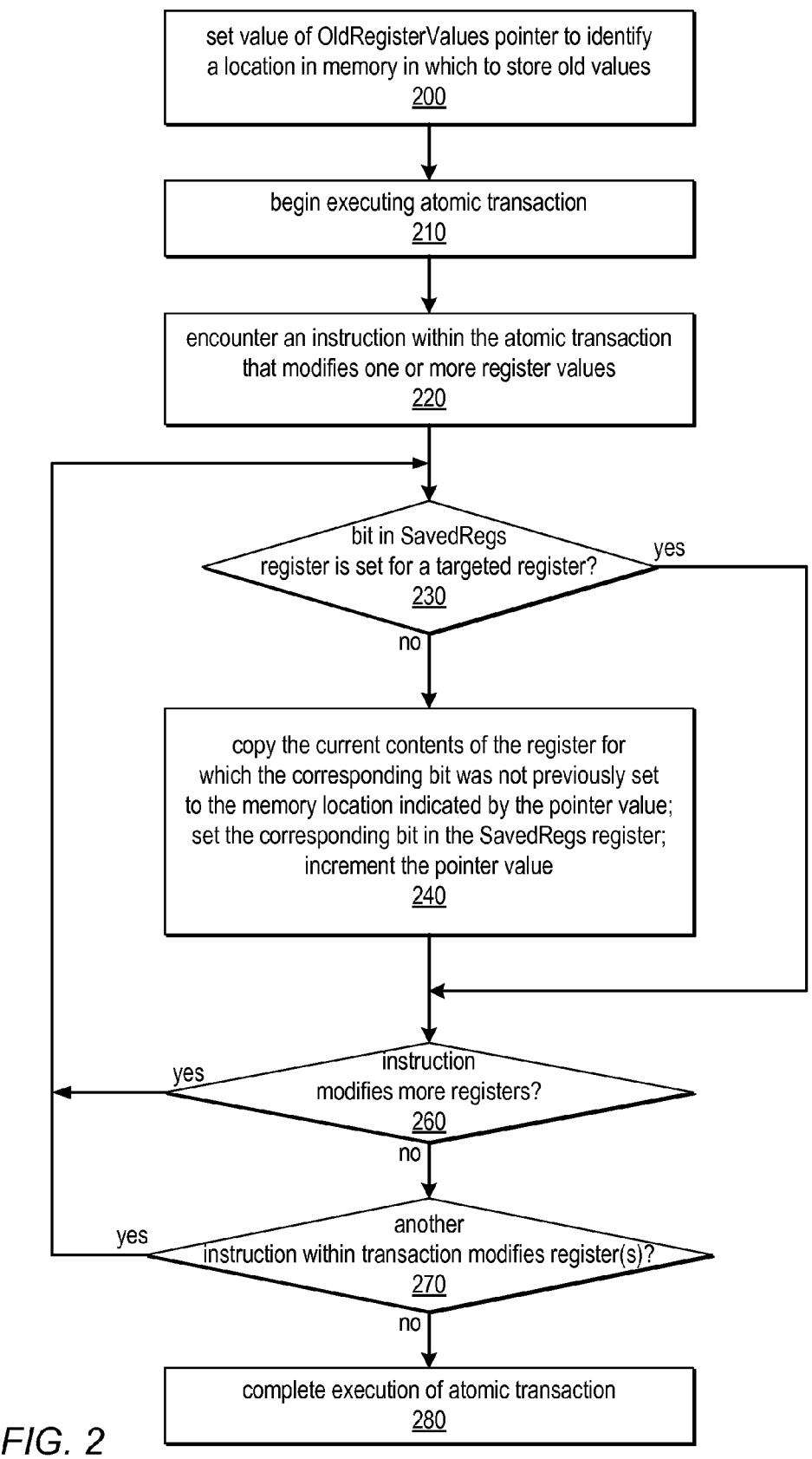
FIG. 2 is a flow diagram illustrating one embodiment of a method for performing incremental register checkpointing, as described herein.

Persons skilled in the art will appreciate that incremental checkpointing may be achieved in a variety of ways, depending on the particular processor architecture, including, but not limited to, using various approaches described herein. FIG. 2 illustrates a method for performing incremental register checkpointing, according to one embodiment. As illustrated at 200, in this example, the method may include setting the value of a pointer, such as the OldRegisterValues pointer described above, to identify a location in memory in which to store the values of registers as part of a checkpointing operation. In various embodiments, this location could be a location in user memory (e.g., system memory), such as a scratch area, or could be a location in on-chip memory dedicated for the checkpointing of registers. As illustrated at 210, in this example, the method may then include beginning execution of an atomic transaction. Note that in other embodiments, the system may first initiate the execution of an atomic transaction, and then may set the value of the OldRegisterValues pointer (e.g., as part of the initiation of the transaction).

As illustrated in this example, during execution of the transaction, an instruction that modifies one or more registers may be encountered, as in 220. In response to encountering this instruction, and prior to performing the modification(s) specified by the instruction, the system may be configured to determine whether a bit in the SavedRegs register corresponding to a given one of the registers to be modified by the instruction is set, as in 230. For example, the SavedRegs register may include a respective bit for each register in the processor's register set indicating whether the register should or should not be checkpointed. If the bit corresponding to the given one of the registers to be modified by the instruction is already set, shown as the positive exit from 230, that register may not need to be checkpointed. For example, the bit may have been set by a previous incremental checkpointing operation (i.e. in response to an earlier instruction that modified the register), or may have been set prior to initiating execution of the transaction (e.g., by the operating system or by application code outside of the atomic transaction) in response to determining (e.g., at compile time) that the register does not need to be checkpointed, in different embodiments. In one example, if through compiler analysis it is determined that a given register is dead at the beginning of the transaction, or that a value written to a given register by an instruction within the transaction will not be read before it is overwritten by another instruction subsequent to the transaction failing or being aborted, the value of the given register may not need to be restored in the case that the transaction fails or is aborted. Therefore, the compiler may insert an instruction to set the corresponding bit in the SavedRegs register at any point prior to the point at which the transaction modifies the value of the given register, thus avoiding unnecessary checkpointing and restoring operations for the given register.

If the bit corresponding to the given register (i.e. the register to be modified by the instruction) is not already set, shown as the negative exit from 230, the method may include copying the current contents of the register to the memory location indicated by the value of the OldRegisterValues pointer, and setting the SavedRegs register bit corresponding to the given register, as in 240. As illustrated in this example, the value of the OldRegisterValues pointer may then be incremented, so that it points to the next memory location in which a checkpointed register value should be stored (e.g., the next location a scratch area in user memory or in on-chip storage). In either case (i.e. whether or not the given one of the registers to be modified is checkpointed), if the instruction modifies more registers, shown as the positive exit from 260, the operations illustrated in 230-240 may be repeated for each of the registers to be modified by the instruction. For example, the respective bits corresponding to each of the other registers to be modified by the instruction may be checked. If any of the bits are not already set, the method may include setting the bit(s) and copying the contents of the corresponding register (s) to memory to checkpoint the register value(s). As described herein, the copying may be performed using non-transactional write operations, and may use a dedicated path from the register file to the memory area in which checkpointed values are stored, in some embodiments.

As illustrated in this example, if there are more instructions within the transaction that modify one or more registers, shown as the positive exit from 270, the method may include repeating the operations shown in 230-260 for each of these other instructions, checkpointing those registers that are modified by the instructions within the transaction whose corresponding bits in the SavedRegs register have not already been set. If there are no other instructions within the transaction that modify registers, shown as the negative exit from 270, the method may include completing execution of the atomic transaction without checkpointing any additional registers, as in 280. For example, the method may include executing the remaining instructions within the transaction and either committing the results of the transaction or aborting (and possibly retrying) the transaction, as described in more detail herein.

When a transaction aborts, in addition to determining a reason for the transaction failure (e.g., by reading a particular processor register, such as a CPS register), the system described herein may restore the checkpointed registers. Using the example illustrated above, the code for the PTI_beginTransaction routine may also include code to restore the checkpointed registers in response to a failed transaction attempt, and before retrying or abandoning the transaction. To do so, in this example, PTI_beginTransaction may read the value of SavedRegs to determine how many registers were checkpointed. In various embodiments, this may be determined by the number of bits set in the SavedRegs registers, (e.g., using the popc instruction), by maintaining a counter, or in other ways. PTI_beginTransaction may then read that many entries from the array, based at OldRegisterValues, in which checkpointed values (and corresponding register names) were stored, and may copy the stored values into the indicated registers.

Note that some care must be taken to ensure that any registers used in performing the restoring operation themselves end up with the correct values. In some embodiments, the system may be configured to use only scratch registers whose values do not have to be preserved for this purpose. In such embodiments, if insufficient scratch registers are available, the contents of some (or all) of the registers may be temporarily stored in thread-local storage in some contexts, or within dedicated areas (e.g., allocated by the compiler) within a stack frame in others, or in some other known location, freeing these registers for use in the restoring of the checkpointed registers. In such embodiments, if a register to be used as a scratch register has been checkpointed, then the old value for that register may be saved, so that restoring the scratch registers does not undo the restoring of a checkpointed register.

Figure 3:
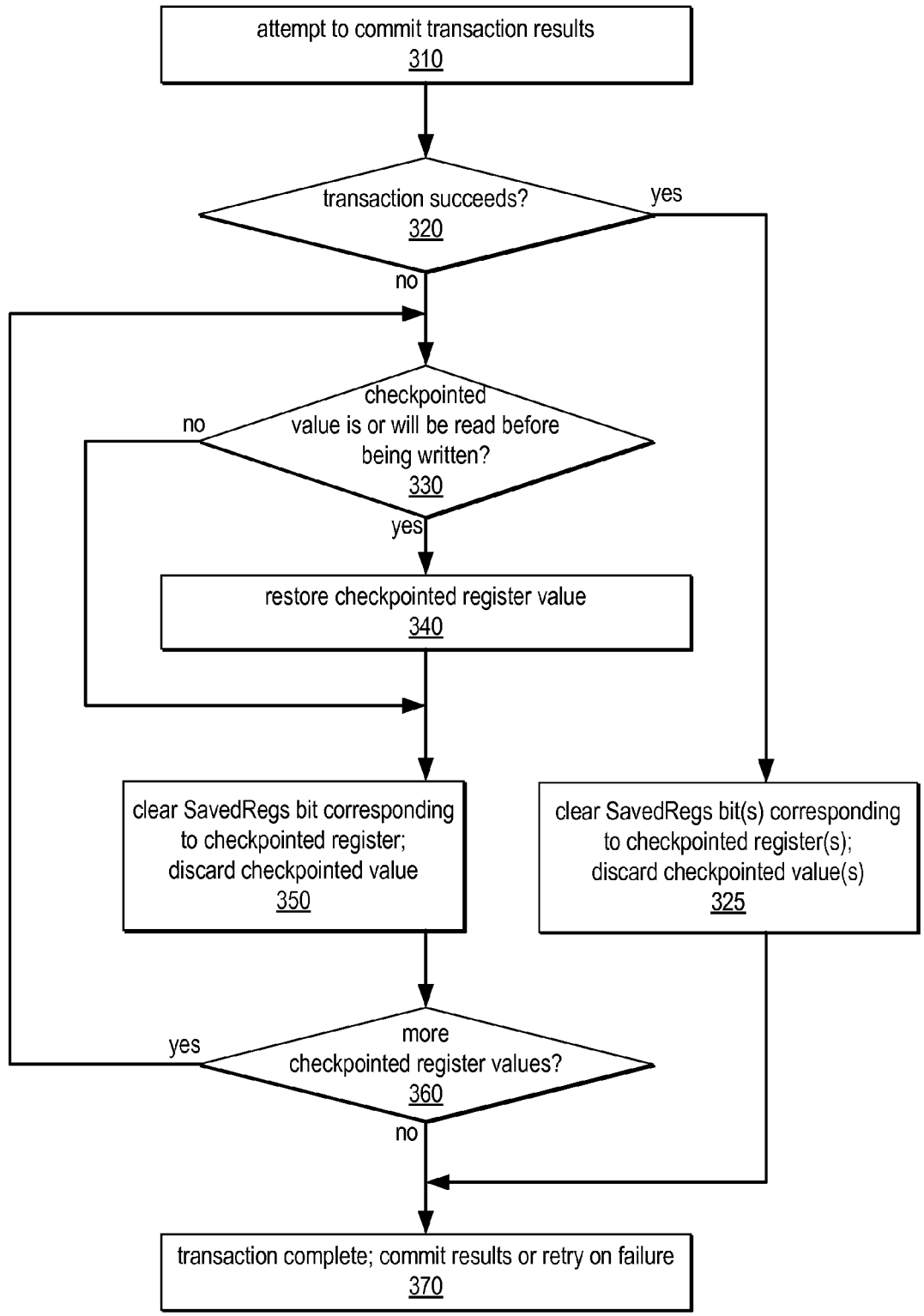
FIG. 3 is a flow diagram illustrating one embodiment of a method for restoring checkpointed register values, as described herein.

One embodiment of a method for restoring checkpointed register values is illustrated in FIG. 3. As illustrated at 310 in this example, the method may begin with an attempt to commit the results of a transaction for which incremental checkpointing has been performed, as described herein. If the attempt to commit the transaction results is unsuccessful (e.g., if a conflict is detected during the attempt to commit the transaction results), shown as the negative exit from 320, the method may include determining whether a register value that was checkpointed during execution of the transaction should be restored. For example, the method may include determining whether the checkpointed value is or will be read subsequent to the transaction aborting, but before being modified by another instruction, as in 330. If so, shown as the positive exit from 330, the method may include restoring the checkpointed value of the register, as in 340. Restoring the checkpointed value may include copying the value of the register that was saved in memory during a checkpointing operation back to the register.

If the checkpointed value will not be read prior to its value being overwritten, shown as the negative exit from 330, the checkpointed value may not be restored, in some embodiments. In other words, there may be no need to restore the checkpointed value in response to the transaction aborting if no instructions will read the register value before its value is again overwritten. As illustrated in this example, if the transaction fails, whether or not a checkpointed value is restored, the method may include clearing the indication that the register was checkpointed, as in 350. For example, the method may include clearing the corresponding bit in the SavedRegs register. Note that in some embodiments, if the corresponding bit in the SavedRegs register was not set in response to an instruction within the atomic transaction that modifies the register, but was set by the operating system or application code outside the atomic transaction (e.g., in response to a compiler analysis or other determination that the register would not need to be restored in the event that the transaction fails), the bit in the SavedRegs register may not be cleared as a result of the transaction failing. As illustrated in FIG. 3, in some embodiments, the method may also include discarding the checkpointed value. For example, the method may include resetting the value of the storage location in which the checkpointed register value was saved or setting it to a default value, in some embodiments. If more register values were checkpointed during the transaction, shown as the positive exit from 360, the method may include repeating the operations illustrated as 330-360 for each of the other checkpointed registers. For example, in some embodiments the method may include restoring only the checkpointed values of registers that are or will be read before they are modified following the transaction abort. Note that in other embodiments, all register values that were checkpointed during a transaction may be restored in the event that the transaction fails.

If the transaction succeeds (i.e. if no conflicts are detected during the attempt to commit the transaction), shown as the positive exit from 320, the method may include clearing the indications that one or more registers were checkpointed during the transaction, and/or discarding the checkpointed register values, as in 325. For example, in some embodiments, the method may include clearing the SavedRegs bit(s) corresponding to checkpointed register(s), and resetting the value of the storage location in which the checkpointed register value was saved or setting it to a default value, in some embodiments.

Once any checkpointed registers that need to be restored have been restored, and indications that the registers have been checkpointed have been cleared, shown as the negative exit from 360 or the exit from 325, the transaction may be complete, and the method may include committing the results of the transaction to the architectural state of the computer (e.g., if the transaction succeeded), or retrying the transaction (e.g., if the transaction failed), as in 370.

Note that in some embodiments, the system may not discard the register values that were stored during a checkpointing operation by resetting the values of the storage locations in which the checkpointed register values were saved or setting them to a default value. Instead, the system may be configured to reset the value of the OldRegisterValues pointer, so that the saved values may be overwritten by a subsequent checkpointing operation (effectively "discarding" the saved values by allowing reuse of the locations in which they were stored).

Note that while the overhead of checkpointing a register may seem high, the system and methods described herein may avoid the conservative execution of similar code for all registers that may or may not need to be checkpointed for each transaction, instead checkpointing only those that are actually modified. This may be particularly beneficial for keeping the latency of small transactions low. Furthermore, using the system and methods described herein, the overhead per transaction may be bounded, as each register is checkpointed at most once.

In some embodiments, the memory area pointed to by OldRegisterValues may be of fixed size and may be reused for multiple transactions. In such embodiments, the memory area may be allocated and the OldRegisterValues register set to point to it just once, e.g., when a thread is created, and may not need to be reinitialized for each transaction. In embodiments in which OldRegisterValues is updated to point to the location for the next register each time a register is checkpointed, the memory area may be treated as a circular buffer, so that there may be no need to reset the OldRegisterValues register before beginning a new transaction.

Note that while the examples described herein assume that nested transactions are either not allowed or are "flattened" so that nested transactions are entirely subsumed by the outermost transaction that contains them, in some embodiments the techniques described herein may be applicable even in contexts where these assumptions may not hold.

In the examples above, the checkpointed register values are organized as a sequential log. In other embodiments a memory area may be allocated to the storage of checkpointed register values that is exactly the size of the register file. In such embodiments, the old value for a register i may be stored in the $i^{th}$ entry of this register backup area. This approach may have the advantage that there is no need to store the names of the checkpointed registers. However, it may require a different mechanism for determining which registers have been checkpointed, so that only those registers will be restored upon abort. In some such embodiments, the bits set in SavedRegs may be used to determine this. However, this may not work for embodiments in which some bits are set at the beginning of the transaction to prevent them from being checkpointed. Therefore, in some embodiments, another bit mask (e.g., another register containing one bit per register of the register file) may be used to record which registers have been checkpointed.

For a given instruction set, the number of registers modified by a single instruction is typically bounded by a small constant. Therefore, the number of registers that potentially must be checkpointed in a single cycle is significantly less than the total number of registers that may need to be checkpointed during an entire transaction. As a result, in embodiments in which checkpointing is done in hardware only, fewer wires may be needed between the register file and the area used to store checkpointed register values than in a processor in which all registers are checkpointed in a single cycle. Because fewer wires may be required to support hardware checkpointing, there may be significant flexibility in the placement of the storage for checkpointed register values. Thus, the techniques described herein may be used in processors in which providing dedicated chip real estate for checkpointing all registers in a single cycle is not feasible.

In some embodiments, each instruction of the processor instruction set may modify at most one register. However, persons skilled in the art will appreciate that the techniques described herein may also be applied to processors whose instruction sets include one or more instructions that can modify two or more registers. In some embodiments, there may be a single path from the register file to the backup register file, and only one register may be checkpointed per clock cycle. As described above, the value of the register may need to be read and saved before it is overwritten. However, in some embodiments this may occur concurrently with the instruction generating the new result to be stored in the register. Thus, the registers may be checkpointed concurrently with ongoing execution, and with no added delay. In embodiments in which multiple instructions are issued and/or multiple registers are targeted, multiple paths may be included in the processor to allow multiple registers to be checkpointed in a single cycle. Alternatively, in response to such conflicts, the system may be configured to insert a stall cycle while multiple registers are being checkpointed.

As previously noted, incremental register checkpointing may in some embodiments be applied in various speculation contexts other than transactional memory and transactional speculation. For example, in a processor that supports speculative execution of alternate paths (e.g., in parallel) the processor may perform incremental checkpointing when instructions in a speculative path modify the value of one or more registers. If the speculation succeeds, information recording which registers were checkpointed, as well as the stored values copied from these registers may be discarded. If the speculation aborts, the registers that were checkpointed may need to be restored. However, they may not necessarily need to be restored immediately, and, as described above, a given checkpointed register may only need to be restored if the register is or will be read before it is written again. For example, for a register that was checkpointed but that will not be read before its modified value is overwritten, the system may simply remove the indication that the register was saved, since the saved value would be overwritten shortly after being restored (i.e. before the saved and restored value is read again). If a register that was checkpointed is or will be read before it is written, the saved register value may need to be restored before the register value is used as an operand. In some embodiments, it may not be necessary to restore a checkpointed value until the affected register is targeted to be read following the failure of the transaction or speculation episode during which its value was checkpointed and then modified. Therefore, such restoration may be performed incrementally, while execution that does not depend on the register's value proceeds, provided that the checkpointed register value is restored before the next time the register is read. In such embodiments, checkpointed values may be restored only for those registers that are read before being written again, rather than all checkpointed registers being restored automatically following a transaction abort or misspeculation. Note that if a speculation (or transaction) fails, as is the case in a bypassing situation, the register checkpoint storage may be configured to supply a checkpointed value directly to the ALU at the same time that it is being restored to the corresponding checkpointed register.

In various examples of hardware-only embodiments described herein, it may be assumed that state and logic near the pipeline and register file are used to record which registers have been checkpointed, and that this state and logic are used in determining whether a register to be modified by a particular instruction needs to be checkpointed. In other embodiments, the system may be configured to send the current value of register(s) that will be modified by every instruction to the checkpointing mechanism, which may not be near the pipeline and/or register file. In such embodiments, the checkpointing mechanism may record which registers have been checkpointed within the current transaction, and may disregard subsequent requests to checkpoint these previously checkpointed registers. This approach may alleviate even more space in the critical real estate around the pipeline and register file, in some embodiments.

Note that because the necessity for a high-bandwidth path to the backup registers may be substantially mitigated by the use of incremental register checkpointing, as described herein, a larger backup register file may be used. In some embodiments, this may make it cheaper to support multiple checkpoints and to revert, for example, to the most recent checkpoint while continuing execution in speculative mode.

It has been observed that it is not uncommon that a register is overwritten without changing its value (i.e. by a "silent write"). In some embodiments, this may not be hard to detect, and the register may not need to be restored on abort, in this case. In various embodiments, the register may not even be checkpointed in such cases. In other embodiments, the register may be checkpointed, but the fact that it has been checkpointed may not be recorded, thus avoiding the need to restore it if the transaction aborts without the register having been written with a different value.

Note that in an embodiment in which hardware writes information about checkpointed registers and their old values into user memory, it may be important to ensure that all such information has reached user memory before software that restores the checkpointed register on abort is executed. In some embodiments, a memory fence may be provided for this purpose. In other embodiments, at least some of the checkpointed register values may be stored in special on-chip storage. Note also that in some embodiments restoring may be performed, at least in part, by hardware, rather than entirely by software.

In one example, some number of registers may be checkpointed in special on-chip storage, and if more than this number of registers is modified, additional checkpointed values may be written into user memory, as described above. In some such embodiments, there may be an instruction for restoring the contents of the on-chip storage to the appropriate registers, and/or there may be an instruction to flush the register names and values into the user memory area. With such an approach, the overhead of checkpointing registers may be reduced, while possibly increasing the overhead of restoring them upon abort. In some embodiments, this may be an appropriate tradeoff, given that it is hopefully the common case that transactions do not abort.

Figure 4:
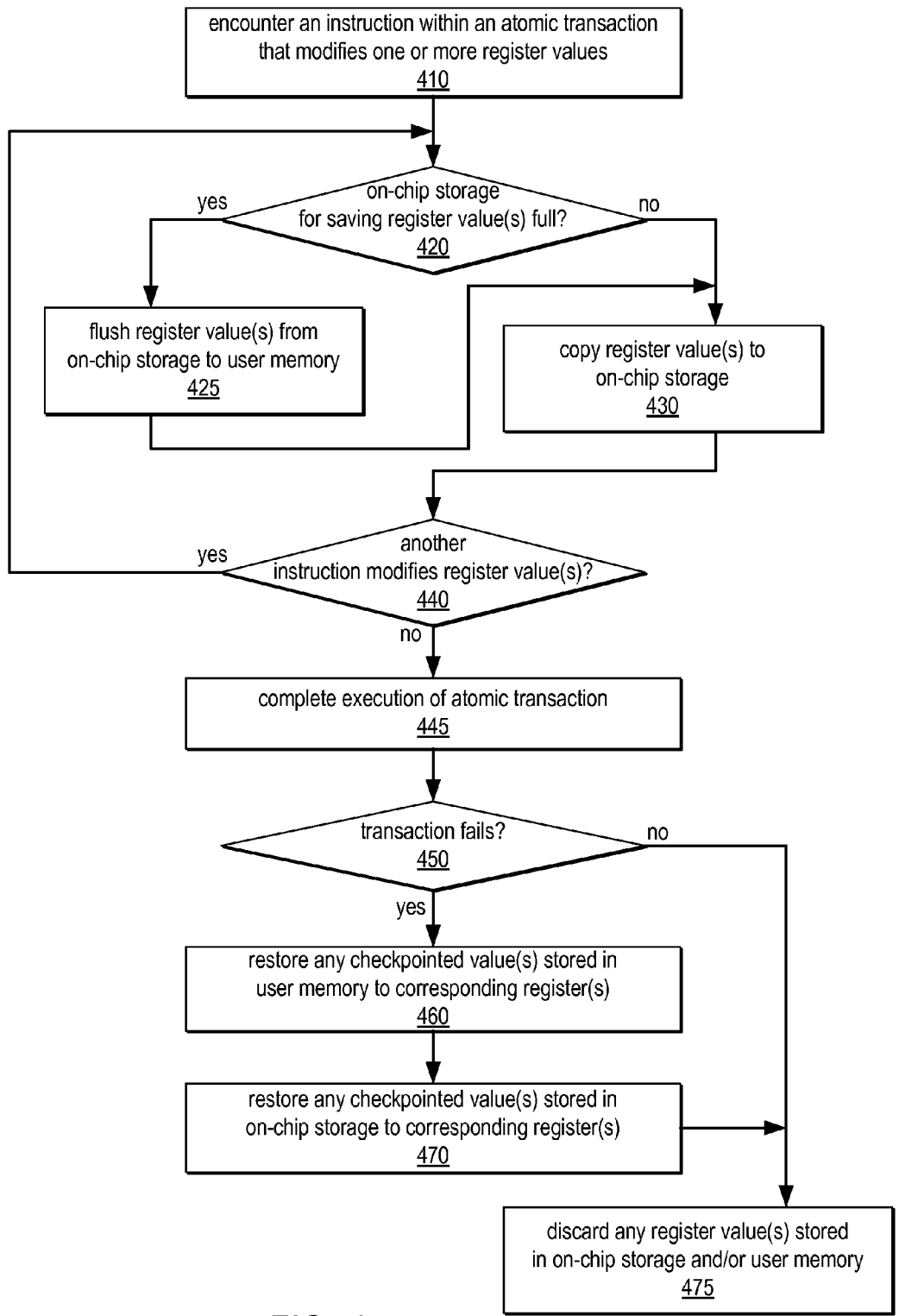
FIG. 4 is a flow diagram illustrating a method for performing incremental register checkpointing that includes a flushing mechanism, according to one embodiment.

One embodiment of a method for performing incremental register checkpointing that includes a flushing mechanism is illustrated in FIG. 4. As illustrated at 410 in this example, the method may be performed in response to encountering a given instruction within an atomic transaction (i.e. during execution of that transaction) that modifies one or more register values. The method may include determining whether on-chip storage for saving checkpointed register values is full, as in 420. For example, in various embodiments, the method may include determining whether on-chip storage dedicated to (or allocated for) storing checkpointed register values is already full, or determining that there are not enough locations remaining in such on-chip storage to checkpoint the registers modified by the given instruction (e.g., if the instruction modifies more than one register value).

If the on-chip storage is full, or too full to checkpoint registers modified by the given instruction, shown as the positive exit from 420, the method may include flushing the register values already stored in the on-chip storage to user memory, as in 425. The flushing of checkpointed values from on-chip storage to user memory may create space in which to store more checkpointed register values, if needed. Once the register values stored in the on-chip storage have been flushed to user memory, or if the on-chip storage is not too full to checkpoint registers modified by the given instruction, shown as the negative exit from 420, the method may include copying the value(s) of the register(s) modified by the given instruction to the on-chip storage, as in 430. Note that as described herein, checkpointing a register value may in some embodiments include setting and/or checking the value of a special register bit that indicates whether a corresponding register has already been (or for other reasons should not be) checkpointed (not shown).

As illustrated in the example illustrated in FIG. 4, if other instructions within the atomic transaction modify registers, shown as the positive exit from 440, the method may include repeating the operations illustrated in 420-430 for each of these additional instructions. Once there are no more instructions within the transaction that modify registers (i.e. once all registers that need to be checkpointed have been checkpointed), shown as the negative exit from 440, the method may include completing execution of the transaction, as in 445. For example, in some embodiments, any remaining instructions of the atomic transaction may be executed, and an attempt may be made to commit the results of the transaction. If the transaction fails to commit its results (e.g., due to a conflict), shown as the positive exit from 450, the method may include restoring any checkpointed values stored in user memory to the corresponding registers (as in 460) and/or restoring any checkpointed values stored in on-chip storage to the corresponding registers (as in 470).

As illustrated in this example, once the transaction is complete (e.g., whether it was successful or not), the method may include discarding any register values stored in on-chip storage and/or user memory, as in 475. Note that in embodiments in which checkpointing a register value includes setting and/or checking the value of a special register bit that indicates whether a corresponding register has been (or should not be) checkpointed, the method may include resetting (e.g., clearing) any such bits that were set during execution of the transaction in response to the completion of the transaction (not shown).

In some embodiments, there may be enough on-chip storage available to checkpoint all registers, and the restoring of checkpointed register values may be done entirely by hardware. However, the systems and methods described herein for performing incremental register checkpointing (whether performed by hardware, in software, or in a combination of hardware and software) may result in significant benefits as compared to previous hardware-implemented register checkpointing mechanisms because there is no requirement to checkpoint all registers very quickly, as is necessary if all transactions (even very short ones) checkpoint all registers. In systems that employ incremental register checkpointing, a much wider variety of hardware designs may be used, and the checkpoint/restore functionality may be less tightly integrated with other related mechanisms than is necessary if the processor is to perform very fast checkpointing of all registers, as in previous systems.

In particular, checkpointing all registers at the beginning of every transaction, as in some previous systems, requires either a highly parallel connection between the register file and the checkpoint storage area, or serializing communication between these components. The latter imposes too much overhead, especially on short transactions, and the former makes it critical that the saved registers be physically close to the main registers, one of the most valuable pieces of chip real estate. Checkpointing registers individually, and only those that are actually modified during the execution of a transaction or other speculative code path, may allow the checkpoint storage area to be farther away from the register file, and may allow the system to exhibit acceptable performance in embodiments in which communication is serialized between them.

The examples described above have been presented in the context of a processor architecture that includes a single register file per thread. However, some processors support the use of multiple register windows, by which the need for expensive operations to save registers and restore them may be avoided, in many cases. For example, in such systems, each procedure called may be allocated its own register window. Therefore, when initiating execution of a transaction or other speculative mechanism, the system may switch the register window without changing the values of the registers in the previous register window. If the transaction or speculation is unsuccessful, the system may switch back to the previous register window, which contains the register values that were current prior to the initiation of the transaction or speculative mechanism. The incremental register checkpointing techniques described herein may be beneficial in such systems in certain contexts, such as when the call depth exceeds the number of register windows. One method of integrating these techniques with a processor that employs register windows is described below.

In this example, it is assumed that there are common APIs and calling conventions, and a requirement that at every point during a transaction's execution, the transaction has executed at least as many checkpoints as it has executed restores. For example, in a system that implements the SPARC™ instruction set, the requirement may be that the transaction has always executed at least as many SAVE instructions as RESTORE instructions. Roughly, this limitation may disallow transactions that return from procedures called outside the transaction (a pattern that is not common). In particular, it may disallow transactions that cannot be expressed in language proposals in which transactions are expressed using "atomic blocks". These assumptions may allow some simplifications in the approach and may also ensure a small bound on the number of registers that are checkpointed (and thus the space needed to hold their old values). Other embodiments may not require these assumptions.

In this example, when a register is checkpointed, its value may be stored with the architectural name it had in the register window that was current at the beginning of the transaction. For example, if register %i4 is modified by a procedure directly called from the lexical scope of the transaction, then the "i" registers of the register window that is current while executing the called procedure are the "o" registers of the register window that was current when the transaction began. Therefore, in this case, the checkpointing should record that the %o4 register was overwritten.

In this example, registers in register windows that do not overlap with the one that was current when the transaction began may not need to be checkpointed, at least until the transaction makes deep enough calls that it needs to spill registers from an unspilled register window. In this example, if there are unspilled register windows other than the current one when a transaction begins, and if the transaction calls deeply enough that a spill would be required, it could be the case that a register window is about to be reused that was unspilled but not current when the transaction began. This register window may not have been checkpointed, but it may need to be restored in the event that the transaction aborts. This may also be true for some number of additional register windows that were unspilled when the transaction began. In one embodiment, described below, the system may avoid the need to checkpoint all of the registers of all of these register windows.

In this example, if a transaction that begins when there are unspilled register windows other than the current one calls deeply enough that a spill trap is required, the transaction may instead abort. Thus, these unspilled windows are not overwritten, and the complexity of restoring them on abort is avoided. In this example, having aborted the transaction, the unspilled register windows may be spilled and invalidated (for example using a flush type instruction), with the result that only one register window (i.e. the current one) is unspilled. This approach may simplify the execution of a subsequent transaction, so that a transaction can call as deeply as it likes, and the system may still need to checkpoint at most one register window. More specifically, a transaction that begins when there is only one unspilled register window may proceed as normal until it calls deeply enough that it is about to spill the original unspilled window. At this point, the original unspilled window may be spilled to the stack as normal, and may become the current window. Before changing any of the registers, the remaining registers that have not been checkpointed previously may all be checkpointed. Note that at this point, this register window is saved on the stack with its current contents, as well as in the memory area for register checkpointing. Thus, correct execution may be ensured whether the transaction commits or aborts. In one example, if the transaction aborts, the logical register state at the beginning of the transaction may be reconstructed by setting an indication (e.g., using the "metaregisters" CANSAVE, etc.) that only the current register window is unspilled, and then restoring the registers from the checkpoint.

Figure 5:
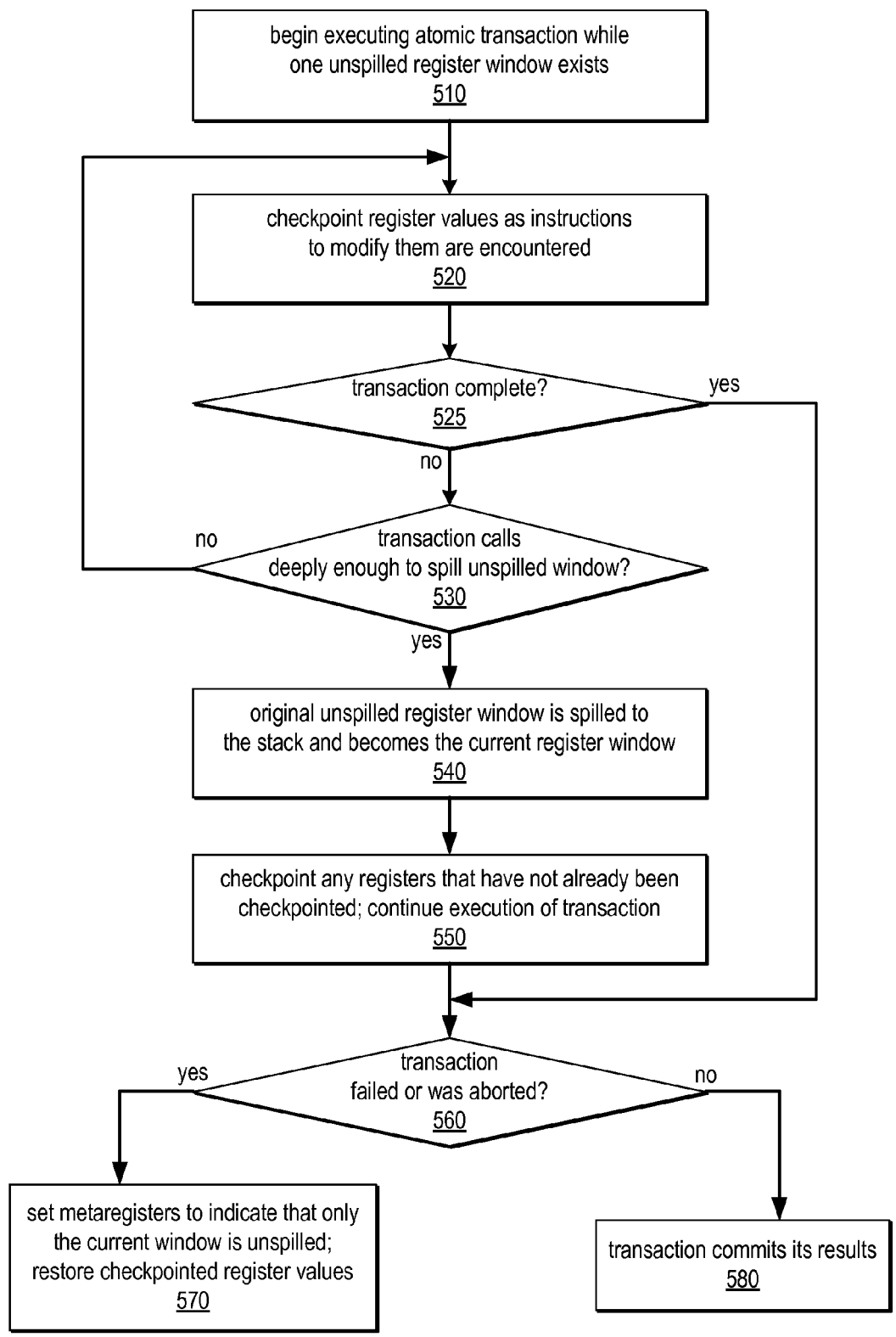
FIG. 5 is a flow diagram illustrating a method for performing incremental register checkpointing in a system that supports multiple register windows, according to one embodiment.

One embodiment of a method for performing incremental register checkpointing in a system that supports multiple register windows is illustrated in FIG. 5. As illustrated at 510 in this example, the method may include beginning execution of an atomic transaction while one (and only one) unspilled register window exists. The method may include checkpointing one or more register values as instructions to modify them are encountered, as in 520. For example, the method may include checking and/or setting the value of a special register bit that indicates whether a corresponding register to be modified by an instruction within the atomic transaction has already been (or otherwise should not be) checkpointed, and copying the contents of the register to on-chip storage or user memory, if it should be checkpointed, as described herein.

In this example, while the transaction continues to execute, shown as the negative exit from 525, register values may be checkpointed as usual until or unless the transaction performs method or procedure calls deeply enough to spill the previously unspilled window, shown as the positive exit from 530. Once that happens, the method may include spilling the original unspilled register window to the stack, and the original unspilled window becoming the current register window, as in 540. In some embodiments, in response to the original unspilled register window being spilled, the method may also include checkpointing any registers of that register window that have not already been checkpointed, as in 550. In this case, as in previous systems, all of the registers are checkpointed. However, in contrast to previous systems, the full set of registers does not always have to be checkpointed, and so it may not be necessary to provide expensive mechanisms (or real estate) to support the fast checkpointing of the full set of registers. As illustrated in this example, the method may include continuing execution of the atomic transaction until the transaction is complete (i.e. until all of the instructions within the transaction have been executed, or until the transaction commits its results or is aborted). Note that while the execution of the atomic transaction continues, there may be no need to perform any additional register checkpointing, since the full set of registers in the register window have been checkpointed.

If the transaction does not call deeply enough to spill the unspilled window, shown as the negative exit from 530 and the feedback to 520, the method may include continuing to checkpoint registers as instructions that modify them are encountered. Once the transaction completes execution, shown as the positive exit from 525 or the exit from 550, if the transaction failed or was aborted, shown as the positive exit from 560, the method may include setting metaregisters to indicate that only the current register window is unspilled, and restoring the checkpointed register values, as in 570. If the transaction succeeds, shown as the negative exit from 560, the method may include committing the results of the transaction, as in 580. As described above, in response to the completion of a transaction (e.g., either successfully or unsuccessfully), the method may include discarding or resetting the indications of which registers have been checkpointed and/or the checkpointed register values (not shown).

As previously noted, in some contexts, there may be registers that do not need to be checkpointed and restored. For example, in some cases, one or more registers may be known to be dead at a particular point in the code. In some embodiments, a compiler may perform "live register analysis" as part of a register allocation process. In such embodiments, a register may be considered "live" if it contains a value that may be read sometime in the future before being overwritten. Live register analysis may ensure that at every point in the code, the compiler knows which registers are live and which are not (i.e. which are dead). The live register set may be substantially smaller than the entire register set at any given point in the code. In some embodiments, the compiler may be configured to insert code to avoid unnecessary checkpointing in such cases by setting the SavedRegs bit corresponding to each such register known to be dead at the beginning of a transaction to a value of one prior to (or at the beginning of) the transaction code. As noted above, starting a checkpointing operation in which the SavedRegs bits for all registers are set to one (or starting a transaction by setting all of the SavedRegs bits to one) may have the same effect as disabling checkpointing operations.

In some embodiments, a register other than the SavedRegs register, e.g., a special NonLiveRegs register, may be used to indicate that some registers do not need to be checkpointed because they are known to be dead at a particular point in the code, and the bits of the SavedRegs register may be used to track the registers that have been checkpointed during the current transaction. In such embodiments, the compiler may be configured to insert code to set a bit in the NonLiveRegs register corresponding to each dead register to a value of one to indicate that the register is known to be dead at the start of the transaction, and the incremental checkpointing methods described herein may check this register, as well as the SavedRegs register, when determining which, if any, registers to checkpoint and/or restore for the transaction. In one example, the contents of the NonLiveRegs register and SavedRegs register may be combined using a bitwise OR operation to identify which registers do not need to be checkpointed. In some embodiments, when a transaction fails and will be retried, the SavedRegs register bits that were set in response to checkpointing one or more registers during the failed attempt to execute the transaction may be cleared, while the NonLiveRegs register bits set in response to the compiler analysis may not be cleared. In some embodiments, a compiler analysis may determine that a register that was checkpointed during a transaction may be read but not overwritten between transactions (or between transaction attempts, e.g., on a retry following a transaction abort). In such embodiments, the compiler may insert code to prevent clearing the corresponding SavedRegs register bit and discarding the saved value of the register between transactions, thus avoiding the need to checkpoint the value again when another transaction (or a retry of a failed transaction) is initiated.

Figure 6A:
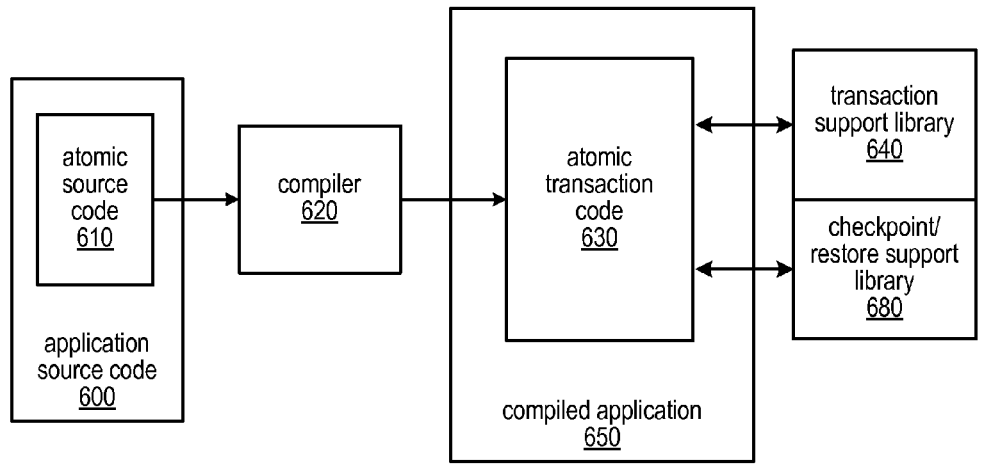
FIG. 6A is a block diagram illustrating a compiler configured to analyze application source code and generate atomic transaction code as part of a compiled application, according to one embodiment.

FIG. 6A is a block diagram illustrating a compiler 620 configured to analyze application source code 600, and then generate atomic transaction code 630 as part of compiled application 650. In this example, a compiler 620 may be configured to replace programmer written code, such as in atomic source code 610, which is to be executed atomically, with alternate code that includes calls to one or more functions that support incremental register checkpointing and/or restore operations for atomic transactions, as described herein. For example, a programmer may write the source code for an application, such as application source code 600, using atomic blocks to specify sets of instructions that should be executed atomically and/or as a transaction. Compiler 620 may be configured to identify sets of instructions or other fragments or portions of an application (e.g., functions, objects, method, classes, etc) by recognizing any of various language constructs that may be used to designate those instructions, fragments or portions to be executed atomically, and to generate code to ensure that they are accessed using transactions. In some embodiments, programmers may write transaction code using familiar coding styles, but the transaction may be effected according to particular transactional memory implementation techniques. The transaction code written by the programmer may be translated, replaced or transformed (e.g., by compiler 620) into a code that is configured to implement transactions according to one or more of various software, hardware, or hybrid transactional memory techniques supported by the execution environment (e.g., the operating system and/or underlying memory subsystem hardware).

Compiler 620 may in some embodiments be configured to generate or insert code configured to perform incremental register checkpointing at various points during execution of atomic transactions. For example, compiler 620 may insert one or more checkpoint and/or restore function calls, or may replace one or more generic function calls (e.g., store instructions, or other instructions that modify one or more register values) with corresponding alternate function calls configured to invoke hardware-implemented or hardware-assisted incremental register checkpointing. These alternate functions may be configured to test an indicator associated with registers to be modified by the instructions within the atomic transaction at runtime to determine whether or not the registers should be checkpointed (i.e. whether the value of the registers should be saved). The alternate functions may also be configured to copy to memory the contents of any registers for which it has been determined that they should be checkpointed. As noted above, in some embodiments, compiler 620 may be configured to set an indicator associated with any register that (according to static analysis) is known to be dead at a particular point in the code in order to avoid unnecessarily checkpointing that register at runtime.

While described herein in terms of a compiler, compiler 620 may also represent other entities configured to generate atomic transaction code 630, according to different embodiments. For instance, in one embodiment, compiler 620 may represent a code optimizer rather than a compiler. In another embodiment, compiler 620 may represent a just-in-time (JIT) compiler. In general, compiler 620 may represent any entity capable of and configured to generate atomic transaction code for implementing transaction methods, as described herein. While described herein as various software entities, compiler 620 may, in some embodiments, represent a hardware-based entity configured to generate atomic transaction code for implementing transaction methods and for performing incremental register checkpointing and restore operations. Note that in other embodiments, some or all of the functions described above as being performed by a compiler, or by software generated on the basis of a compiler analysis (e.g., identifying instructions that modify registers, determining whether those registers need to be checkpointed, checkpointing and/or restoring those registers, etc.), may instead be performed in hardware. In such embodiments, there may be no need for a compiler to produce code that explicitly causes these functions to be performed.

Application source code 600 and/or atomic source code 610 may represent program instructions in any of various languages, according to various embodiments. For example, in some embodiments, atomic source code 610 may represent code written in a high level programming language, such as C, C++, or Java™. In other embodiments, atomic source code 610 may represent binary instructions or assembly instructions. In yet other embodiments, atomic source code 610 may also represent compiler-intermediate instructions or virtual machine byte code instructions, such as Java™ byte code instructions.

As illustrated in FIG. 6A, atomic transaction code 630 may be configured to utilize and/or include one or more libraries of transaction enabling code, such as transaction support library 640 and/or checkpoint/restore support library 680. In various embodiments, atomic transaction code 630 and/or transaction support library 640 may include functionality to execute transactions according to various software transactional memory techniques. For example, in some embodiments, atomic transaction code 630 may include the functionality to begin and end transactions according to various software transactional memory techniques. In another example, atomic transaction code 630 may make calls into the transaction support library 640 for beginning and committing software transactions, and/or for performing one or more memory access. Additional functionality, such as the ability to support self-abort and nesting in transactions, may be provided by functions of transaction support library 640, in some embodiments.

Checkpoint/restore library 680 may include functions configured to determine if register checkpointing should be performed in response to encountering an instruction that modifies one or more instructions and/or to invoke such checkpointing, as described herein. Checkpoint/restore library 680 may also include functions configured to restore checkpointed register values (e.g., in the case that the atomic transaction fails to commit its results or is otherwise aborted). In the example illustrated in FIG. 6A, compiler 620 may be configured to generate atomic transaction code 630 that calls functions provided by checkpoint/restore support library 680 and/or transaction support library 640. In some embodiments, both checkpoint/restore support functions and generic transaction support functions may be included in a single transaction support library, rather than in separate libraries.

As previously noted, while numerous examples described herein are directed to the application of incremental register checkpointing in the context of atomic transactions, persons skilled in the art may appreciate that these systems and methods may be more generally applicable to a variety of speculation techniques and implementations in which register checkpointing may be employed.

Figure 6B:
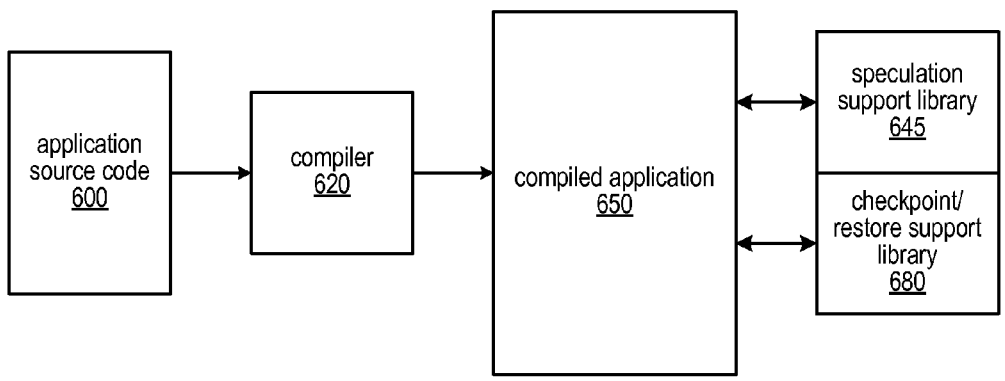
FIG. 6B is a block diagram illustrating a compiler configured to analyze application source code and generate a compiled application in a system that supports various types of speculation and for which incremental register checkpointing may be performed, according to one embodiment.

FIG. 6B is a block diagram illustrating a compiler 620 configured to analyze application source code 600, and then generate compiled application 650 in a system that supports other types of speculation and for which incremental register checkpointing may be performed. In this example, compiler 620 may be configured to replace programmer written code, such as in application source code 600 with alternate code that includes calls to one or more functions that support incremental register checkpointing and/or restore operations for various speculation mechanisms. For example, compiler 620 may be configured to identify sets of instructions or other fragments or portions of an application (e.g., functions, objects, method, classes, etc) by recognizing any of various language constructs that may be used to designate those instructions, fragments or portions to be executed speculatively, and to generate code to cause them to be executed speculatively. The code written by the programmer may be translated, replaced or transformed (e.g., by compiler 620) into a code that is configured to execute instructions speculatively according to one or more of various software, hardware, or hybrid speculation techniques supported by the execution environment (e.g., the operating system and/or underlying processor).

Compiler 620 may in some embodiments be configured to generate or insert code configured to perform incremental register checkpointing at various points during execution of compiled application 650. For example, compiler 620 may insert one or more checkpoint and/or restore function calls, or may replace one or more generic function calls (e.g., store instructions, or other instructions that modify one or more register values) with corresponding alternate function calls configured to invoke hardware-implemented or hardware-assisted incremental register checkpointing. These alternate functions may be configured to test an indicator associated with registers to be modified by instructions executed speculatively at runtime to determine whether or not the registers should be checkpointed (i.e. whether the value of the registers should be saved). The alternate functions may also be configured to copy to memory the contents of any registers for which it has been determined that they should be checkpointed. As noted above, in some embodiments, compiler 620 may be configured to set an indicator associated with any register that (according to static analysis) is known to be dead at a particular point in the code in order to avoid unnecessarily checkpointing that register at runtime. Again note that in other embodiments, some or all of the functions described above as being performed by a compiler, or by software generated on the basis of a compiler analysis (e.g., identifying instructions that modify registers, determining whether those registers need to be checkpointed, checkpointing and/or restoring those registers, etc.), may instead be performed in hardware. In such embodiments, there may be no need for a compiler to produce code that explicitly causes these functions to be performed.

As illustrated in FIG. 6B, compiled application 650 may be configured to utilize and/or include one or more libraries of speculation enabling code, such as speculation support library 645 and/or checkpoint/restore support library 680. In various embodiments, compiled application 650 and/or speculation support library 645 may include functionality to execute instructions speculatively according to various data or instruction speculation techniques. Checkpoint/restore library 680 may include functions configured to determine if register checkpointing should be performed in response to encountering an instruction that modifies one or more instructions and/or to invoke such checkpointing, as described herein. Checkpoint/restore library 680 may also include functions configured to restore checkpointed register values (e.g., in the case that the speculation fails). In the example illustrated in FIG. 6B, compiler 620 may be configured to generate compiled application 650 that calls functions provided by checkpoint/restore support library 680 and/or speculation support library 645. In some embodiments, both checkpoint/restore support functions and generic speculation support functions may be included in a single speculation support library, rather than in separate libraries.

Figure 7:
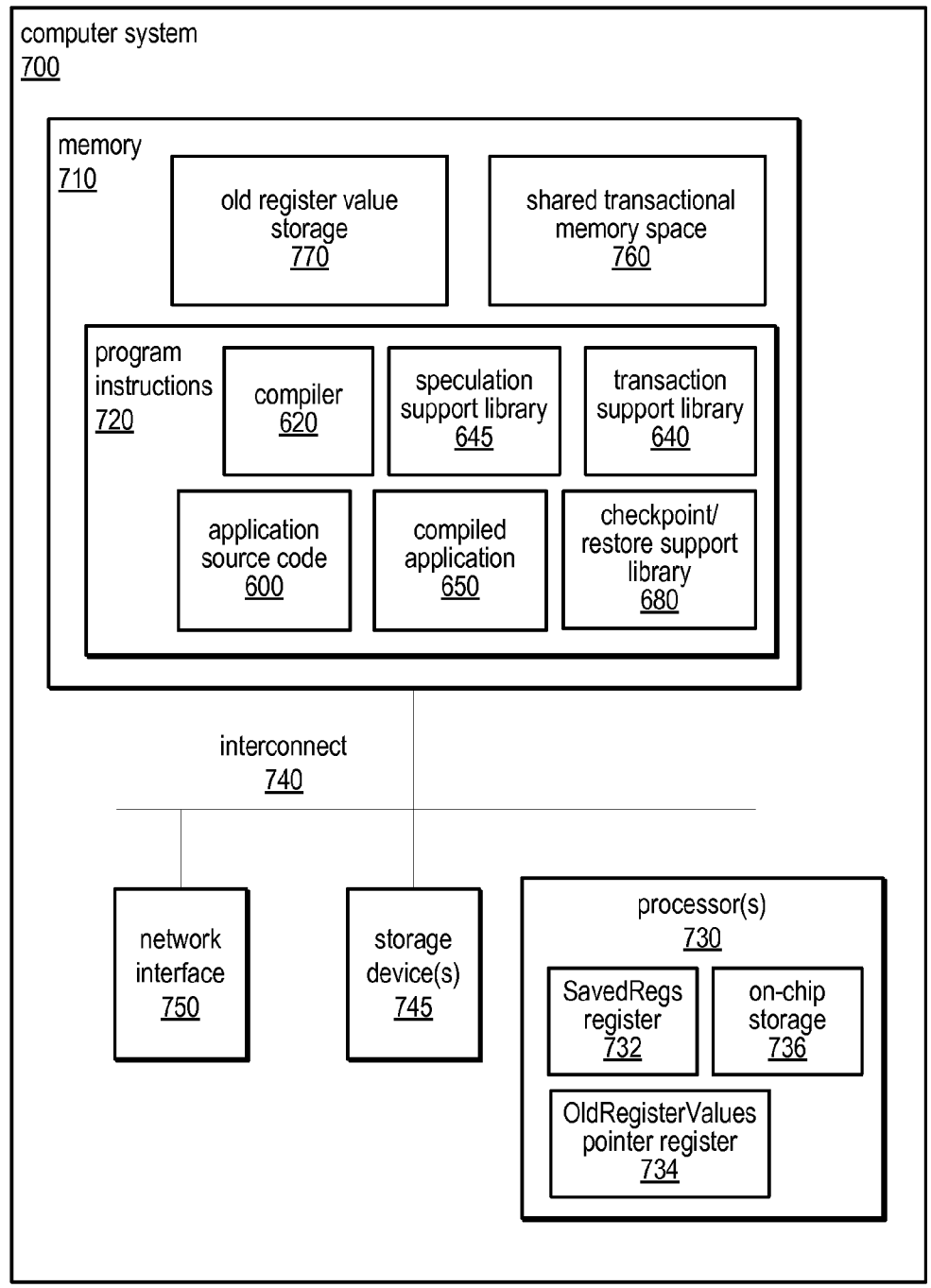
FIG. 7 is a block diagram illustrating a computer system configured to implement a transactional memory and/or other speculative mechanisms, and that employs incremental register checkpointing, as described herein.

The techniques described herein for performing incremental register checkpointing may be implemented in any of a wide variety of computing systems. FIG. 7 illustrates a computing system configured to perform incremental register checkpointing for use with atomic transactions and other speculative mechanisms, as described herein and according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage media; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 700 may include a processor unit 730 (possibly including multiple processors, a single-threaded processor, a multi-threaded processor, a multi-core processor, etc.). As described herein, processor 730 may in some embodiments include a SavedRegs register 732, an OldRegisterValues pointer register 734, and/or on-chip storage 736. The computer system 700 may also include one or more system memories 710 (e.g., one or more of cache, SRAM, DRAM, RDRAM, EDO RAM, DDR RAM, SDRAM, Rambus RAM, EEPROM, etc.), a system interconnect 740 (e.g., LDT, PCI, ISA, etc.), a network interface 750 (e.g., an ATM interface, an Ethernet interface, a Frame Relay interface, etc.), and one or more storage device(s) 745 (e.g., optical storage, magnetic storage, etc.). The memory medium may include other types of memory as well, or combinations thereof. Embodiments of the invention may include fewer or additional components not illustrated in FIG. 7 (e.g., video cards, audio cards, additional network interfaces, peripheral devices, etc.). The processor unit 730, the storage device(s) 745, the network interface 750, and the system memory 710 are coupled to the system interconnect 740. One or more of the system memories 710 may embody a compiler 620 configured to provide executable functional sequences for implementing incremental checkpointing for atomic transactions, and/or other speculative mechanisms. Additionally, one or more of the system memories 710 may embody a compiled application 650 including code specifying one or more atomic transactions, or including code portions of which may be executed speculatively.

In some embodiments, memory 710 may include program instructions 720 configured to implement a compiler, such as compiler 620, configured to generate executable code that includes atomic transactions and that includes calls to functions of transaction support library 640, speculation support library 645, and/or checkpoint/restore support library 680, as described herein. Additionally, program instructions 720 may comprise application source code 600 including code configured to request or specify atomic transactions, as well as compiled application 650, as described herein. Program instructions 720 may also be configured to implement a transaction support library 640, configured to provide various methods for implementing atomic transactions, as described herein, and/or speculation support library 645, configured to facilitate methods for implementing data and/or instruction speculation. Program instructions 720 may also be configured to implement checkpoint/restore support library 680, configured to provide various checkpoint and/or restore methods for use with atomic transactions and/or other speculative mechanisms, as described herein.

Compiler 620, application source code 600, compiled application 650, checkpoint/restore support library 680, speculation support library 645, and/or transaction support library 640 may each be implemented in any of various programming languages or methods. For example, in one embodiment, compiler 620, checkpoint/restore support library 680, speculation support library 645, and transaction support library 640 may be JAVA based, while in another embodiments, they may be written using the C or C++ programming languages. Similarly, application source code 600 may be written using Java, C, C++, or another programming language, according to various embodiments. Moreover, in some embodiments, compiler 620, checkpoint/restore support library 680, speculation support library 645, transaction support library 640, and application source code 600 may not be implemented using the same programming language. For example, application source code 600 may be C++ based, while compiler 620 may be developed using C.

As illustrated in FIG. 7, memory 710 may also include a shared transactional memory space 760, which may support and/or be accessed by transactions in a software transactional memory implementation, a hardware transactional memory implementation, and/or a hardware-software hybrid transactional memory implementation, in different embodiments. In some embodiments, memory 710 may include one or more storage locations configured to store checkpointed register values, such as in old register value storage 770. In other embodiments, checkpointed register values may be stored in user memory on one or more of storage devices 745.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   a processor initiating execution of a sequence of instructions comprising an atomic transaction;
   during execution of the sequence of instructions, the processor encountering an instruction within the atomic transaction that modifies a value of a processor register;
   in response to said encountering:
   the processor determining whether the processor register should be checkpointed; and
   in response to determining that the processor register should be checkpointed, the processor checkpointing the processor register, where said checkpointing comprises:

saving the value of the processor register; and
setting a value of an indicator associated with the processor register to a value that indicates that the processor register has been checkpointed; and in response to the atomic transaction failing to commit its results:
the processor determining whether the value of the processor register will be modified prior to being read by another instruction; and
the processor restoring the saved value of the processor register to the processor register unless it is determined that the processor register will be modified prior to being read by another instruction;

wherein no processor registers are checkpointed in response to said encountering other than those whose values are modified by the encountered instruction; and wherein at least some of said determining, said saving, or said setting are performed by hardware mechanisms within the processor.

2. The method of claim 1, wherein said determining whether the processor register should be checkpointed comprises:
checking the value of the indicator associated with the processor register;
wherein if the value of the indicator indicates that the processor register has already been checkpointed, the processor register should not be checkpointed.

3. The method of claim 1, further comprising:
the processor setting a value of a pointer register to a value identifying a storage location in which the value of the processor register is to be saved.

4. The method of claim 1, further comprising:
in response to completion of the atomic transaction, setting the value of the indicator associated with the processor register to a value that indicates that the processor register has not been checkpointed.

5. The method of claim 1, further comprising:
during execution of the sequence of instructions, the processor encountering a second instruction within the atomic transaction that modifies the value of the processor register; and
in response to said encountering the second instruction:
the processor determining that the processor register should not be checkpointed; and
in response to determining that the processor register should not be checkpointed, the processor executing the second instruction without checkpointing the processor register;
wherein no processor registers are checkpointed in response to encountering the second instruction other than those whose values are modified by the second instruction.

6. The method of claim 1, further comprising:
during execution of the sequence of instructions, the processor encountering a second instruction within the atomic transaction that modifies a value of a second processor register; and
in response to said encountering the second instruction:
the processor determining whether the second processor register should be checkpointed; and
in response to determining that the second processor register should not be checkpointed, the processor executing the second instruction without checkpointing the processor register;
wherein no processor registers are checkpointed in response to encountering the second instruction other than those whose values are modified by the second instruction.

7. The method of claim 1, further comprising:
prior to said initiating execution of the sequence of instructions, the processor setting the value of the indicator associated with the processor register to a value that indicates that the processor register should not be checkpointed;
wherein said determining whether the processor register should be checkpointed comprises:
checking the value of the indicator associated with the processor register.

8. A system, comprising:
a processor; and
a memory coupled to the processor and storing a sequence of instructions comprising an atomic transaction;
wherein during operation the processor:
initiates execution of the atomic transaction;
during execution of the sequence of instructions, encounters an instruction within the atomic transaction that modifies a value of a processor register;
in response to encountering the instruction within the atomic transaction that modifies the value of the processor register:
determines whether the processor register should be checkpointed; and
in response to determining that the processor register should be checkpointed, checkpoints the processor register, where checkpointing comprises:
saving the value of the processor register; and
setting a value of an indicator associated with the processor register to a value that indicates that the processor register has been checkpointed; and
in response to the atomic transaction failing to commit its results:
the processor determining whether the value of the processor register will be modified prior to being read by another instruction; and
the processor restoring the saved value of the processor register to the processor register unless it is determined that the processor register will be modified prior to being read by another instruction;
wherein no processor registers are checkpointed by the processor in response to encountering the instruction within the atomic transaction that modifies the value of the processor register other than those whose values are modified by that instruction; and
wherein at least some of the determining whether the processor register should be checkpointed, the saving of the value of the processor register, or the setting the value of an indicator are performed by hardware mechanisms within the processor.

9. The system of claim 8, wherein determining whether the processor register should be checkpointed comprises:
checking the value of the indicator associated with the processor register;
wherein if the value of the indicator indicates that the processor register has already been checkpointed, the processor register should not be checkpointed.

10. The system of claim 8, wherein during operation, the processor sets a value of a pointer register to a value identifying a storage location in which the value of the processor register is to be saved.

11. The system of claim 8, wherein during operation and in response to completion of the atomic transaction, the processor sets the value of the indicator associated with the processor register to a value that indicates that the processor register has not been checkpointed.

12. The system of claim 8, wherein during operation and in response to encountering a second instruction within the atomic transaction that modifies the value of the processor register, the processor:
- determines that the processor register should not be checkpointed; and
- in response to determining that the processor register should not be checkpointed, executes the second instruction without checkpointing the processor register;
- wherein no processor registers are checkpointed in response to encountering the second instruction other than those whose values are modified by the second instruction.

13. The system of claim 8,
- wherein during operation and prior to initiating execution of the sequence of instructions, the processor sets the value of the indicator associated with the processor register to a value that indicates that the processor register should not be checkpointed; and
- wherein determining whether the processor register should be checkpointed comprises checking the value of the indicator associated with the processor register.

14. A method, comprising:
- a processor initiating speculative execution of a sequence of instructions;
- during the speculative execution of the sequence of instructions, the processor encountering an instruction within the sequence of instructions that modifies a value of a processor register; and
- in response to said encountering:
  - the processor determining whether the processor register should be checkpointed;
  - in response to determining that the processor register should be checkpointed, the processor checkpointing the processor register, where said checkpointing comprises:
    - saving the value of the processor register; and
    - setting a value of an indicator associated with the processor register to a value that indicates that the processor register has been checkpointed; and
  - in response to determining that the speculative execution was a result of misspeculation:
    - the processor determining whether the value of the processor register will be modified prior to being read by another instruction; and
    - the processor restoring the saved value of the processor register to the processor register unless it is determined that the processor register will be modified prior to being read by another instruction;
- wherein no processor registers are checkpointed in response to said encountering other than those whose values are modified by the encountered instruction; and
- wherein at least some of said determining, said saving, or said setting are performed by hardware mechanisms within the processor.

15. The method of claim 14, wherein said determining whether the processor register should be checkpointed comprises:
- checking the value of the indicator associated with the processor register;
- wherein if the value of the indicator indicates that the processor register has already been checkpointed or if the value of the indicator indicates that the processor register should not be checkpointed, the processor register should not be checkpointed.

16. The method of claim 14, further comprising:
- in response to completion of the speculative execution of the sequence of instructions, the processor setting the value of the indicator associated with the processor register to a value that indicates that the processor register has not been checkpointed.

* * * * *